G. R. FARRELL.
COMB STAMPING AND CUTTING DIE.
APPLICATION FILED OCT. 27, 1908.
926,693.
Patented June 29, 1909.
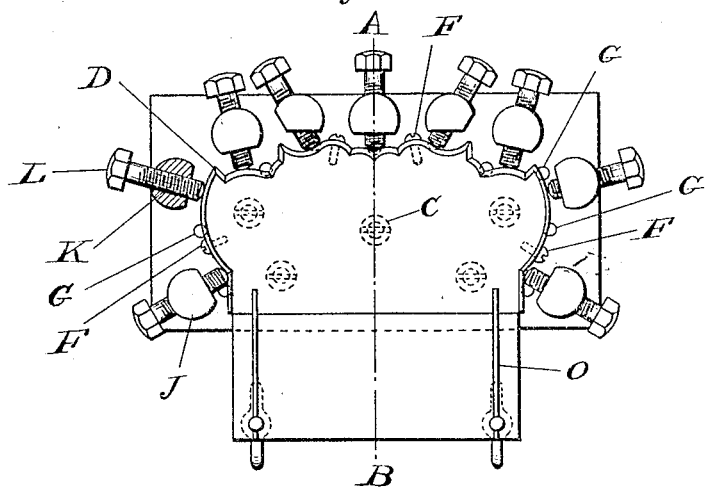
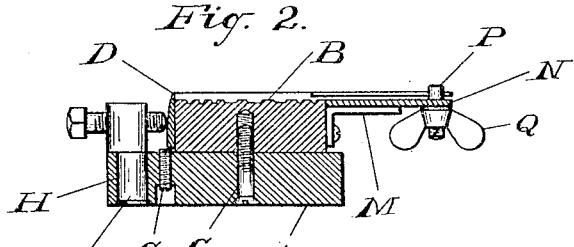
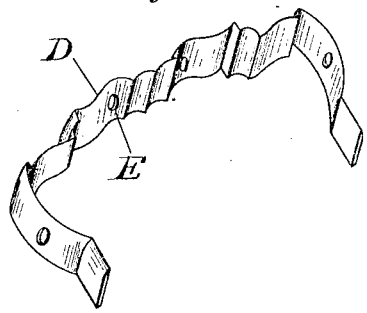
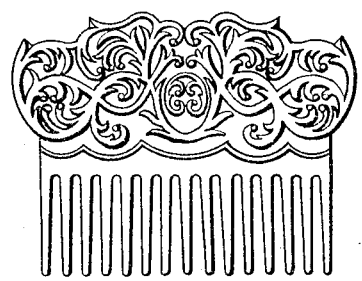
Witnesses:
Chas. E. Chase.
Samuel P. George.
Inventor:
George R. Farrell.
by O. A. Taft. Att'y.

UNITED STATES PATENT OFFICE.

GEORGE R. FARRELL, OF LEOMINSTER, MASSACHUSETTS.

COMB STAMPING AND CUTTING DIE.

No. 926,693.  Specification of Letters Patent.  Patented June 29, 1909.

Application filed October 27, 1908. Serial No. 459,308.

*To all whom it may concern:*

Be it known that I, GEORGE R. FARRELL, of Leominster, in the county of Worcester and State of Massachusetts, have invented certain new and useful Improvements in Comb Stamping and Cutting Dies; and I do hereby declare that the following is a full, clear, and exact description of the same.

This invention relates to cutting machines and particularly to die stamps therefor.

An object of this invention is to provide a cutting and embossing die in which the cutting member is adjustable with relation to the embossing member in order that material of different thicknesses may be acted on.

A further object of this invention is to provide means for holding the cutter in adjustable relation to the embossing member and means for pressing the cutter into engagement with the said embossing member.

A further object of this invention is to cut a comb or like object in the outline and with an ornamental edge and simultaneously therewith to emboss or ornament the head or body of the comb proper, thereby completely cutting and ornamenting the comb at one stroke of a press or cutter head.

A still further object of the invention is to provide a cutter or blade and means for pressing the blade into contact with a die, the said means for pressing the blade being adjustable in order that it may operate on the blade at different angles.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, in which—

Figure 1, is a top plan view of a combined embossing and cutting device. Fig. 2, is a sectional view on the line A—B, of Fig. 1; Fig. 3, is a perspective view of the cutter blade; and Fig. 4, is a plan view of a finished comb.

In these drawings A, denotes a base and B, a die block adjustable thereon through the medium of screws C. That is to say, the die block may be held at different positions of adjustment with relation to the base and it may be elevated out of engagement with the base, or it may be brought into contact therewith as shown in Fig. 2.

The edge of the die block is shaped to the contour of the surface to be cut and said edge is provided with a blade or knife D, shaped to the contour of the said edge. The blade is provided with transversely elongated apertures E, which receive the screws F, threaded in the die block. The blade or knife is secured against movement by means of the screws F, although the screws may be loosened to permit the adjustment of the blade or knife, owing to the fact that the apertures E, are elongated transversely.

As a means for effecting an adjustment of the blade or knife, a series of screws G, are threaded in the base A, and have their ends bearing against the under edge of the blade or knife, and by turning the screws G, the blade or knife is elevated or is allowed to rest on the base according to the requirements of the operator. As shown in Fig. 2, the cutting edge of the blade or knife projects a suitable distance above the surface of the die block so that the cutting edge penetrates the material acted on by the die block at the time the said die block has acted on the surface of the material. If the material to be operated upon is so thick as to prevent the cutting edge of the knife penetrating it by the time the die block has performed its function, the screws G, may be moved to project the cutting edge of the knife a greater distance above the surface of the die block.

The base A, is provided with a series of sockets H, in which shanks I, of posts J, are partially rotatable and each post is provided with a threaded aperture K, to receive the set screws L, which have their ends bearing against the blade for the purpose of holding it on the edge of the die block. As the posts are partially rotatable it follows that the screws may be adjusted to bear on the blade at slightly different positions according to the requirements and the contour of the edge of the die block.

Brackets M, are secured to the die block and a plate N, is supported on said brackets. Fingers O, project over the surface of the plate N, and into apertures of shanks P, which shanks project through the plate and have their lower ends threaded to receive the winged nuts Q.

As shown in Fig. 1, there is a series of screws C, under the die block B, and these screws have to be adjusted to cause the die block to lie parallel with the base, in order to get the best results from the operation of the device. It will also be observed that there is a series of screws G, in order that the blade may be supported at different points throughout its length, and it will be observed that the adjustment of the blade is entirely independent of the adjustment of the die block. The plate N, is for the purpose of sustaining the teeth portion of the comb blank while the cutter and die are being operated. Fingers O, retain said comb blank in position and are adjustably secured by means of shanks P, and winged nuts Q.

I claim—

1. In a cutting and embossing device, a base, a die block, means for adjusting the die block with relation to the base, a blade secured to the edge of the die block and having its cutting edge projecting above the surface of the die block, means for adjusting the blade, and means for frictionally holding the blade in contact with the edge of the die block.

2. In a cutting and embossing device, a base, a die block adjustable with relation to the base, said die block having screw threaded apertures in its edge, a blade conforming to the contour of the die block and having apertures elongated transversely of the blade, screws threaded in the apertures of the die block adapted to bear against the blade for retaining it in its adjusted position, and screws threaded in the base and bearing against the under surface of the blade.

3. In a cutting and embossing device, a base, a die block, a blade conforming to the contour of the die block and bearing against the edge thereof, posts having shanks adjustably mounted in the base, screws threaded in the posts and having their ends bearing against the blades, means for adjusting the blade, and screws for clamping the blade to the die block.

4. In a cutting and embossing device, a base, a die block, brackets thereon, a plate on the brackets, fingers extending over the surface of the plate, shanks having apertures to receive the fingers, and means for clamping the shanks in adjusted relation to the plate.

5. In a cutting and embossing device, a base, a die block, a blade having its cutting edge projecting above the surface of the die block, brackets on the die block, a plate on the brackets, said plate having apertures, fingers extending over the surface of the plate, shanks having apertures to receive the fingers, said shanks projecting through the apertures of the plate, and nuts threaded on the shanks for clamping the fingers to the plate.

GEORGE R. FARRELL.

Witnesses:
  O. A. TAFT,
  K. S. TAFT